United States Patent
Ikehata et al.

(10) Patent No.: US 10,406,809 B2
(45) Date of Patent: Sep. 10, 2019

(54) INKJET PRINTER

(71) Applicant: Roland DG Corporation, Hamamatsu-shi, Shizuoka (JP)

(72) Inventors: Katsuo Ikehata, Hamamatsu (JP); Yoshinari Ogura, Hamamatsu (JP); Yuya Nishihara, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 0 days.

(21) Appl. No.: 16/038,216

(22) Filed: Jul. 18, 2018

(65) Prior Publication Data

US 2019/0023011 A1 Jan. 24, 2019

(30) Foreign Application Priority Data

Jul. 19, 2017 (JP) .................. 2017-140053

(51) Int. Cl.
| | |
|---|---|
| B41J 2/14 | (2006.01) |
| B41J 2/205 | (2006.01) |
| B41J 2/045 | (2006.01) |
| B41J 2/21 | (2006.01) |
| H04N 1/00 | (2006.01) |

(52) U.S. Cl.
CPC ....... *B41J 2/14201* (2013.01); *B41J 2/04501* (2013.01); *B41J 2/205* (2013.01); *B41J 2/2054* (2013.01); *B41J 2/2132* (2013.01); *H04N 1/00* (2013.01)

(58) Field of Classification Search
CPC .... B41J 2/14201; B41J 2/04501; B41J 2/205; B41J 2/2054; B41J 2/2132; H04N 1/00
See application file for complete search history.

(56) References Cited

U.S. PATENT DOCUMENTS

| 9,889,663 B2* | 2/2018 | Suzuki .................. B41J 2/1433 |
| 2011/0234661 A1 | 9/2011 | Goto et al. |
| 2011/0235068 A1 | 9/2011 | Chang |

FOREIGN PATENT DOCUMENTS

| JP | 2001-322262 A | 11/2001 |
| JP | 2005-059499 A | 3/2005 |
| JP | 2005-280110 A | 10/2005 |
| JP | 2010-179563 A | 8/2010 |
| JP | 2011-201206 A | 10/2011 |
| JP | 2013-067031 A | 4/2013 |
| JP | 2016-132140 A | 7/2016 |
| JP | 2017-213711 A | 12/2017 |

* cited by examiner

*Primary Examiner* — Thinh H Nguyen
(74) *Attorney, Agent, or Firm* — Keating & Bennett, LLP

(57) ABSTRACT

An inkjet printer composes a first dot group including a first base dot group from ink dots of a first ink, and a second dot group including a second base dot group and a second additional dot group from ink dots of a second ink having a weaker color developing capability than the first ink. A total proportion of the first dot group with respect to the ink dots of the first ink is set to be a first print coverage greater than or equal to 100%. A total proportion of the second dot group with respect to the ink dots of the second ink is set to be a second print coverage greater than the first print coverage. Ink dots including the second additional dot group form a first print layer, and ink dots including the first base dot group and the second base dot group form a second print layer over or under the first print layer.

8 Claims, 6 Drawing Sheets

FIG.4

| | CYAN | | | MAGENTA | | | YELLOW | | | BLACK | |
|---|---|---|---|---|---|---|---|---|---|---|---|
| ADDITIONAL PRINT COVERAGE | BASE PRINT COVERAGE | TOTAL PRINT COVERAGE | ADDITIONAL PRINT COVERAGE | BASE PRINT COVERAGE | TOTAL PRINT COVERAGE | ADDITIONAL PRINT COVERAGE | BASE PRINT COVERAGE | TOTAL PRINT COVERAGE | ADDITIONAL PRINT COVERAGE | BASE PRINT COVERAGE | TOTAL PRINT COVERAGE |
| 14% | 100% | 114% | 16% | 100% | 116% | 35% | 100% | 135% | 0% | 100% | 100% |
| Ra1(111) | | Rt1 | Ra2(112) | | Rt2 | Ra3(113) | | Rt3 | Ra4(114) | | Rt4 |

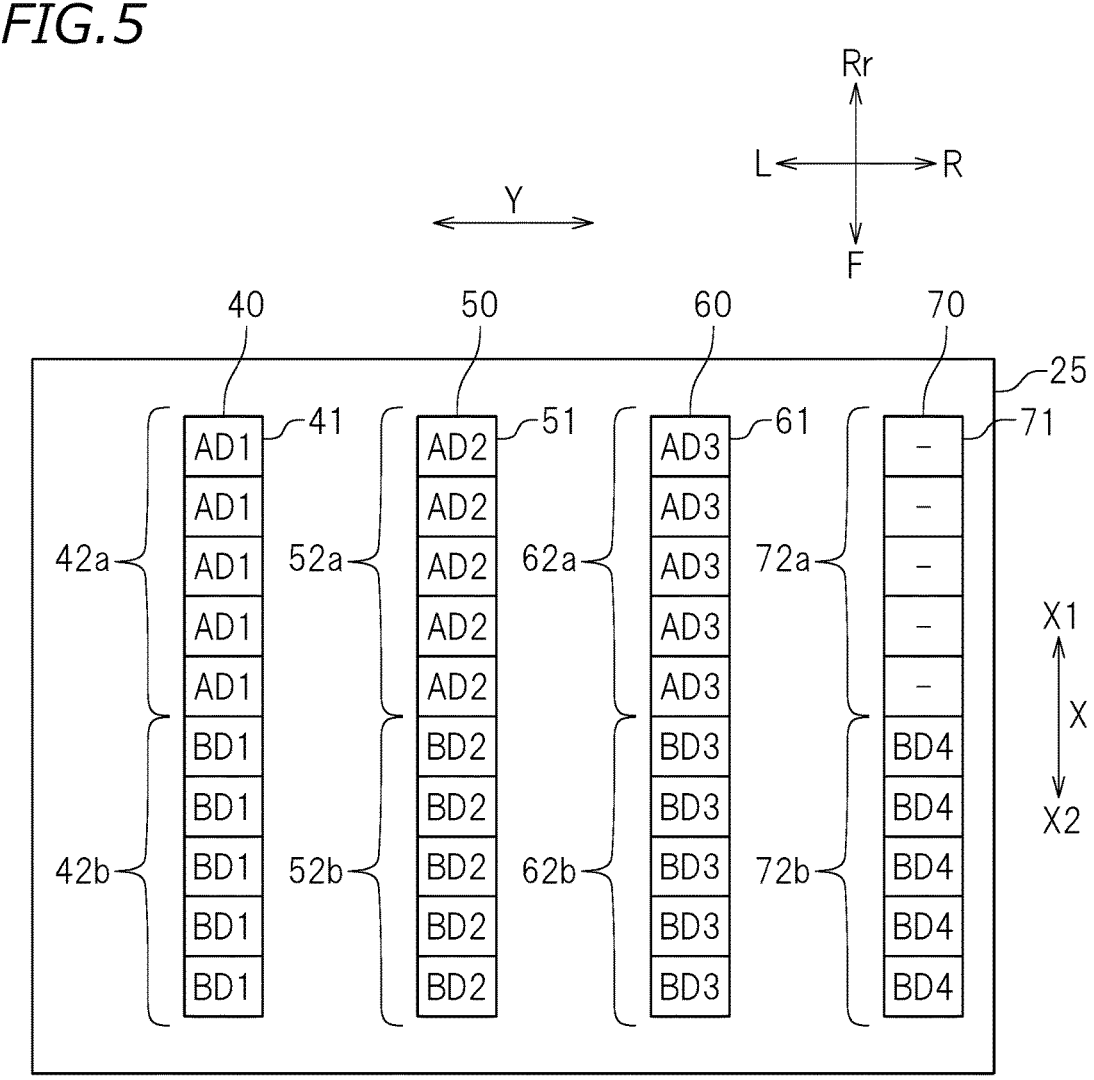

FIG.6

| SB | | CYAN | | | MAGENTA | | | YELLOW | | | BLACK | | |
|---|---|---|---|---|---|---|---|---|---|---|---|---|---|
| | | ADDITIONAL PRINT COVERAGE | BASE PRINT COVERAGE | TOTAL PRINT COVERAGE | ADDITIONAL PRINT COVERAGE | BASE PRINT COVERAGE | TOTAL PRINT COVERAGE | ADDITIONAL PRINT COVERAGE | BASE PRINT COVERAGE | TOTAL PRINT COVERAGE | ADDITIONAL PRINT COVERAGE | BASE PRINT COVERAGE | TOTAL PRINT COVERAGE |
| ○ | A | 14% | 100% | 114% | 16% | 100% | 116% | 35% | 100% | 135% | 0% | 100% | 100% |
| ◉ | B | 18% | 100% | 118% | 12% | 100% | 112% | 35% | 100% | 135% | 0% | 100% | 100% |
| ○ | C | 10% | 100% | 110% | 20% | 100% | 120% | 35% | 100% | 135% | 0% | 100% | 100% |

Columns labeled: Ra1 (Cyan Additional), Ra2 (Magenta Additional), Ra3 (Yellow Additional), Ra4 (Black Additional)

INKJET PRINTER

CROSS REFERENCE TO RELATED APPLICATIONS

This application claims the benefit of priority to Japanese Patent Application No. 2017-140053 filed on Jul. 19, 2017. The entire contents of this application are hereby incorporated herein by reference.

BACKGROUND OF THE INVENTION

1. Field of the Invention

The present invention relates to inkjet printers.

2. Description of the Related Art

An inkjet printer for large-format printing is well known, in which a plurality of recording heads are arrayed in a direction orthogonal to a head-unit scanning direction to enable the printer to print a large area of a recording medium in a short time. JP 2013-067031 A discloses an inkjet recording device in which a plurality of head units are aligned in a scanning direction, each of the head units including a plurality of recording heads aligned in a transfer direction that is orthogonal to the scanning direction.

As disclosed in JP 2013-067031 A, a color inkjet printer usually uses inks of four or more colors. A plurality of colors of inks are ejected onto a recording medium so that they form respective colors of ink dots. The inkjet printer expresses midtones, which are not available in the colors of the inks, by balancing ink dots of various colors. However, the inks show varying color developing capability for a recording medium, that is, one ink may have a relatively stronger color developing capability while another ink have a relatively weaker color developing capability. Consequently, the color balance of the actually printed product may become different from the color balance of the original image on the print data. More specifically, the colors of the inks with relatively stronger color developing capability for the recording medium may appear stronger, while the colors of the inks with relatively weaker color developing capability may appear weaker.

The term "color developing capability" herein means the degree of how vividly an ink on the recording medium appears. The phrase "color developing capability is weaker" means that the ink does not appear vividly, and the phrase "color developing capability is stronger" means that the ink appears vividly. It is possible that the content of coloring material in the ink may be used as an indicator of the strength of color developing capability. It should be noted that, depending on the recording medium, the same ink may result in different absolute values of color developing capability or may result in different relative strengths of color developing capability.

When the color balance of the printed product becomes different from that of the original image because of the difference in color developing capability of the inks, the color balance of the printed product is adjusted by reducing the ejection amounts of the inks other than the ink with the weakest color developing capability to match the ejection amount of the ink with the weakest color developing capability. However, reducing the ink ejection amounts as in the above-described manner limits the capability of the printer, and the printed products produced by such a method result in insufficient ink ejection amounts, in comparison with the cases where the ink ejection amounts are not reduced. A consequent problem is that the vividness in produced images will be poorer.

SUMMARY OF THE INVENTION

In view of the foregoing, preferred embodiments of the present invention provide inkjet printers that make it possible to perform printing in which both color balance and vividness are improved and satisfactory.

An inkjet printer according to a preferred embodiment of the present invention includes a recording head and a controller. The recording head includes a first ink head and a second ink head. The first ink head includes a plurality of first nozzles that eject a first ink onto a recording medium, to form ink dots of the first ink on the recording medium. The second ink head includes a plurality of second nozzles that eject a second ink onto the recording medium, to form ink dots of the second ink on the recording medium. The second ink has a weaker color developing capability than the first ink. The controller is configured or programmed to include a first composer, a second composer, a first print controller, a second print controller, a first dot proportion setter, and a second dot proportion setter. The first composer receives data for the ink dots of the first ink, and composes one or a plurality of first dot groups including at least a first base dot group from the ink dots of the first ink. The second composer receives data for the ink dots of the second ink, and composes a plurality of second dot groups including a second base dot group and a second additional dot group from the ink dots of the second ink. The first print controller controls the recording head to cause ink dots including at least the second additional dot group to form a first print layer on the recording medium. The second print controller controls the recording head to cause ink dots including at least the first base dot group and the second base dot group to form a second print layer over or under the first print layer. The first dot proportion setter sets a proportion or proportions of the one or more first dot groups so that a total of the proportion(s) of the one or more first dot groups with respect to the ink dots of the first ink becomes a first print coverage of greater than or equal to 100%. The second dot proportion setter sets proportions of the plurality of second dot groups so that a total of the proportions of the plurality of second dot groups with respect to the ink dots of the second ink becomes a second print coverage that is greater than the first print coverage.

The inkjet printer described above makes it possible to satisfy both color balance and vividness in print image quality. This inkjet printer also composes dot groups including base dot groups and additional dot groups from ink dots of each of the inks so that the total of the base dot group and the additional dot group is greater than or equal to 100% with respect to all the ink dots of each of the inks. As a result, this inkjet printer ensures sufficient ink ejection amounts and consequently ensures sufficient vividness of the image. On that basis, an ink with a weaker color developing capability is set to have a higher compositional proportion than an ink with a stronger color developing capability, so that the color balance is corrected. Therefore, at least one of the inks has a compositional proportion greater than 100%. In order to achieve the compositional proportion that is greater than 100%, the inkjet printer forms two or more print layers on top of each other. In the first print layer of the two or more print layers, ink dots of the "additional dot group" are formed, while in the second print layer, ink dots of the "base dot group" are formed. Thus, the inkjet printer adjusts the color balance within a region in which the proportion of a dot group is greater than or equal to 100% with respect to all the ink dots, to satisfy both color balance and vividness in print image quality.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a view illustrating an example of an image quality setting panel.

FIG. 5 is a view illustrating how ink is ejected from the nozzles during printing.

FIG. 6 is a view illustrating an example of an image quality setting panel according to a second preferred embodiment of the present invention.

DETAILED DESCRIPTION OF THE PREFERRED EMBODIMENTS

Figure 1:
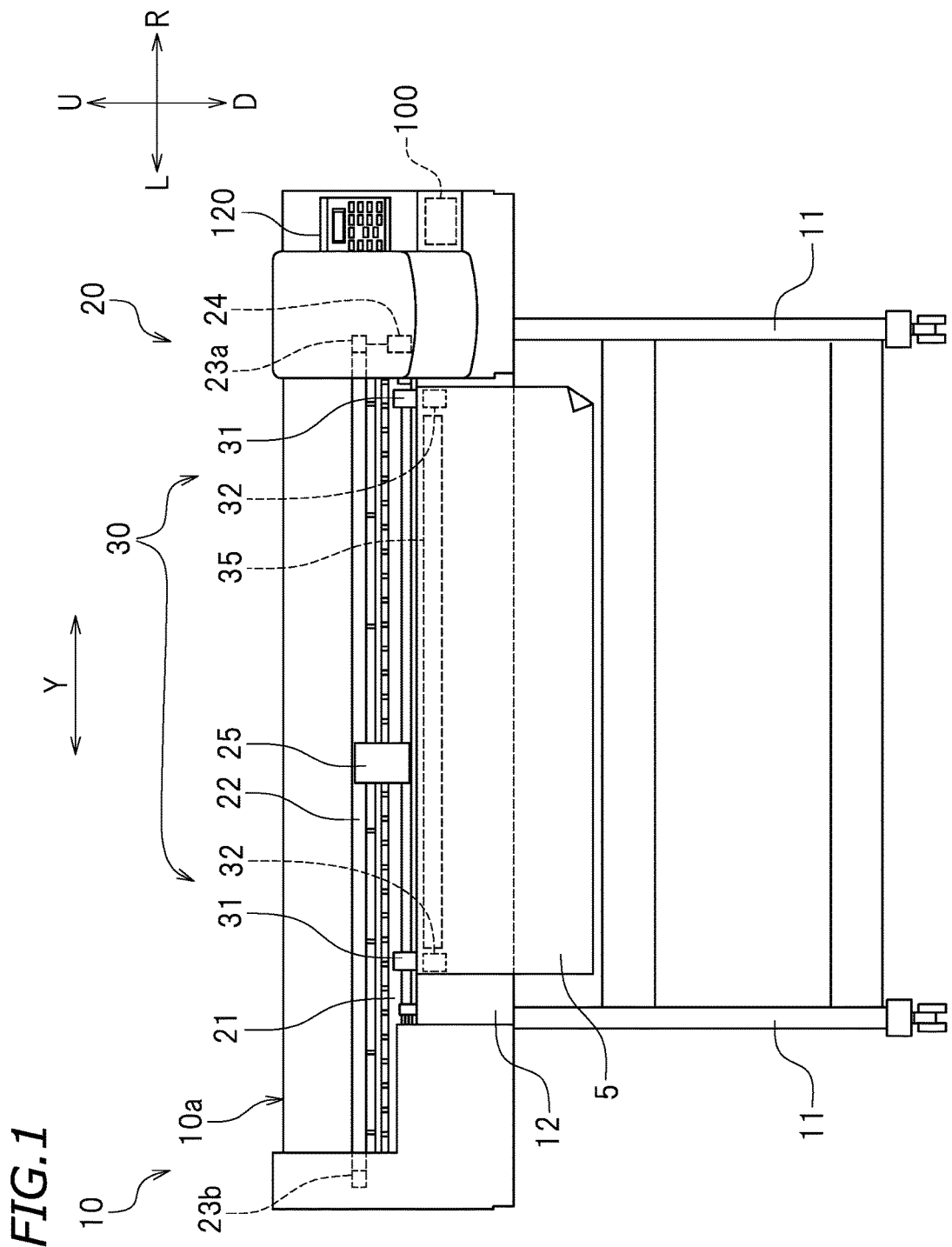
FIG. 1 is a front view illustrating an inkjet printer according to a preferred embodiment of the present invention.

Hereinbelow, inkjet printers according to some preferred embodiments of the present invention will be described with reference to the drawings. It should be noted, however, that the preferred embodiments described herein are, of course, not intended to limit the present invention. The features and components that exhibit the same effects are denoted by the same reference symbols, and repetitive description thereof may be omitted as appropriate. In the following description, with respect to the user standing in front of the inkjet printer, a direction toward the user relative to the inkjet printer is defined as "frontward", and a direction away from the user relative to the inkjet printer is defined as "rearward". In the drawings, reference character Y represents the main scanning direction, and reference character X represents the sub-scanning direction X that is orthogonal to the main scanning direction Y. Reference characters F, Rr, L, R, U, and D in the drawings represent front, rear, left, right, up, and down, respectively. These directional terms are, however, merely provided for convenience in description, and are not intended to limit in any way the manner in which the inkjet printer should be arranged.

First Preferred Embodiment

Figure 2:
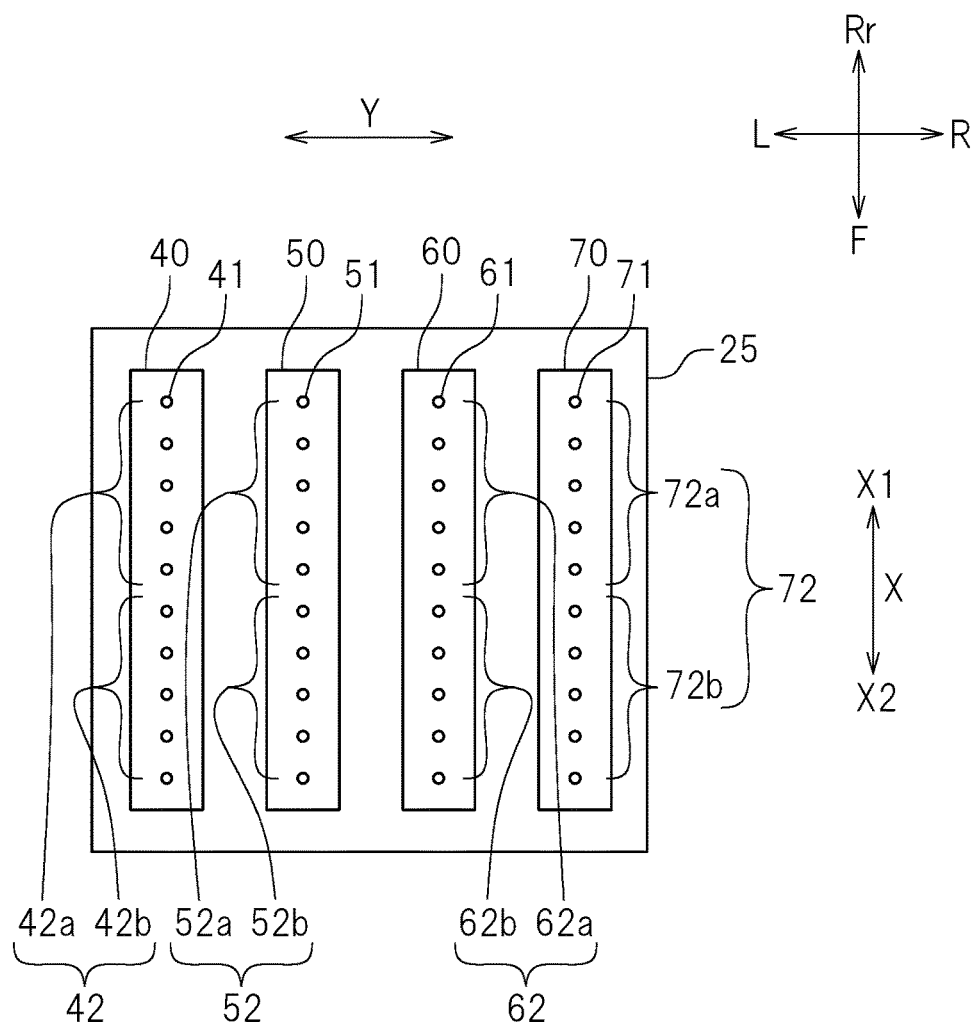
FIG. 2 is a schematic view illustrating the configuration of the bottom surface of a carriage.

FIG. 1 is a front view of a large-format inkjet printer (hereinafter simply "printer") 10 according to a preferred embodiment of the present invention. The printer 10 causes a rolled recording medium 5 to be consecutively transferred frontward and causes ink to be ejected from ink heads 40, 50, 60, and 70 (all of which are shown in FIG. 2), which are mounted on a carriage 25 that moves along the main scanning direction Y, to thereby print images on the recording medium 5. Insofar as the printer 10 herein is concerned, the directional term "downstream X2" means "frontward", and the directional term "upstream X1" means "rearward", as appropriate.

The recording medium 5 is an object on which images are to be printed. The recording medium 5 is not limited to a particular material. The recording medium 5 may be, for example, paper materials such as plain paper and printing paper for inkjet printers, transparent sheets made of glass or resin, or sheets made of metal or rubber.

As illustrated in FIG. 1, the printer 10 includes a printer main body 10a and legs 11 that support the printer main body 10a. The printer main body 10a extends along the main scanning direction Y. The printer main body 10a includes a guide rail 21 and a carriage 25 engaged with the guide rail 21. The guide rail 21 extends along the main scanning direction Y. The guide rail 21 guides movement of the carriage 25 along the main scanning direction Y. An endless belt 22 is secured to the carriage 25. The belt 22 is wrapped around a pulley 23a, which is disposed near the right end of the guide rail 21, and a pulley 23b, which is disposed near the left end of the guide rail 21. A carriage motor 24 is fitted to the right-side pulley 23a. The carriage motor 24 is electrically connected to a controller 100. The carriage motor 24 is controlled by the controller 100. Driven by the carriage motor 24, the pulley 23a rotates, and the belt 22 runs accordingly. This causes the carriage 25 to move in a main scanning direction Y along the guide rail 21. Thus, as the carriage 25 moves in a main scanning direction Y, the ink heads 40 to 70 accordingly move in the main scanning direction Y. In the present preferred embodiment, the belt 22, the pulley 23a, the pulley 23b, and the carriage motor 24 define a main-scanning-direction conveyor 20 that moves the carriage 25 and the ink heads 40 to 70, mounted on the carriage 25, along the main scanning direction Y.

A platen 12 is disposed below the carriage 25. The platen 12 extends along the main scanning direction Y. The recording medium 5 is to be placed on the platen 12. Pinch rollers 31 that press the recording medium 5 downward from above are provided above the platen 12. The pinch rollers 31 are disposed rearward relative to the carriage 25. The platen 12 is provided with grit rollers 32. The grit rollers 32 are disposed below the pinch rollers 31. The grit rollers 32 are provided at positions that face the pinch rollers 31. The grit rollers 32 are connected to a feed motor 33 (see FIG. 3). The grit rollers 32 are rotatable as a result of receiving the driving force from the feed motor 33. The feed motor 33 is electrically connected to the controller 100. The feed motor 33 is controlled by the controller 100. As the grit rollers 32 rotate with the recording medium 5 being pinched between the pinch rollers 31 and the grit rollers 32, the recording medium 5 is delivered in a sub-scanning direction X. In the present preferred embodiment, the pinch rollers 31, the grit rollers 32, and the feed motor 33 define a sub-scanning-direction transfer device 30 that moves the recording medium 5 in a sub-scanning direction X.

FIG. 2 is a schematic view illustrating the configuration of the surface of the carriage 25 that faces the recording medium 5 (the bottom surface thereof in the present preferred embodiment). As illustrated in FIG. 2, the first ink head 40, the second ink head 50, the third ink head 60, and the fourth ink head 70 are provided in the bottom surface of the carriage 25. As illustrated in FIG. 2, in the carriage 25, the first ink head 40 to the fourth ink head 70 are arrayed along the main scanning direction Y. The first ink head 40, the second ink head 50, the third ink head 60, and the fourth ink head 70 define a recording head.

Each of the first ink head 40 to the fourth ink head 70 ejects a process color ink for producing color images. In the present preferred embodiment, the first ink head 40 ejects cyan ink. The second ink head 50 ejects magenta ink. The third ink head 60 ejects yellow ink. The fourth ink head 70 ejects black ink. It should be noted, however, that the number of ink heads is not limited to 4, and that the process color inks are not limited to any particular type of process color ink.

As illustrated in FIG. 2, the first ink head 40 includes a plurality of nozzles 41 arrayed along the sub-scanning direction X. In the first ink head 40 of the present preferred embodiment, the plurality of nozzles 41 are arrayed in one line to define a nozzle array 42. However, the arrangement of the nozzles 41 is not limited in any way. The nozzle array 42 includes a first upstream nozzle array 42a located upstream X1 with respect to the sub-scanning direction X, and a first downstream nozzle array 42b located downstream X2 with respect to the sub-scanning direction X. In the present preferred embodiment, the number of nozzles 41 in the first upstream nozzle array 42a and the number of nozzles 41 in the first downstream nozzle array 42b are equal. However, the number of nozzles 41 in the first upstream nozzle array 42a and the number of nozzles 41 in the first downstream nozzle array 42b are not limited to those in this example.

Each of the second ink head 50 to the fourth ink head 70 also has the same configuration as that of the first ink head 40. Specifically, the second ink head 50 includes nozzles 51 arrayed along the sub-scanning direction X, and the nozzles 51 define a nozzle array 52. The nozzle array 52 includes a second upstream nozzle array 52a located upstream X1 with respect to the sub-scanning direction X, and a second downstream nozzle array 52b located downstream X2 with respect to the sub-scanning direction X. The third ink head 60 includes nozzles 61 arrayed along the sub-scanning direction X, and the nozzles 61 define a nozzle array 62. The nozzle array 62 includes a third upstream nozzle array 62a located upstream X1 with respect to the sub-scanning direction X, and a third downstream nozzle array 62b located downstream X2 with respect to the sub-scanning direction X. The fourth ink head 70 includes nozzles 71 arrayed along the sub-scanning direction X, and the nozzles 71 form a nozzle array 72. The nozzle array 72 includes a fourth upstream nozzle array 72a located upstream X1 with respect to the sub-scanning direction X, and a fourth downstream nozzle array 72b located downstream X2 with respect to the sub-scanning direction X. The nozzles of the second ink head 50 to the fourth ink head 70 are aligned with the nozzles 41 of the first ink head 40 with respect to the sub-scanning direction X. In each of the second ink head 50 to the fourth ink head 70 as well, the number of the nozzles of the upstream nozzle array and the number of the nozzles of the downstream nozzle array are equal.

Although FIG. 2 shows that each of the first ink head 40 to the fourth ink head 70 includes only 10 nozzles, it should be noted that each one of actual ink heads includes a far larger number of nozzles (for example, 300 nozzles). However, the number of nozzles is not limited to any particular number.

The first ink head 40 to the fourth ink head 70 are provided with actuators (not shown) disposed therein, each of which is equipped with, for example, a piezoelectric element. The actuators are electrically connected to the controller 100. The actuators are controlled by the controller 100. By actuating the actuators, ink is ejected from the nozzles of the ink heads 40 to 70 onto the recording medium 5.

The first ink head 40 to the fourth ink head 70 are allowed to communicate with ink cartridges (not shown) respectively by ink supply passages (not shown). The ink cartridges may be provided detachably, for example, in a right end portion of the printer main body 10a. The materials of the inks are not limited in any way, and various types of materials that have conventionally been used as the ink materials for inkjet printers may be used. The inks may be solvent-based pigment inks or aqueous pigment inks. The inks may also be aqueous dye inks, ultraviolet curing pigment inks that cure when irradiated with ultraviolet rays, or the like.

As illustrated in FIG. 1, the printer 10 includes a heater 35. The heater 35 is disposed below the platen 12. The heater 35 is disposed frontward relative to the grit rollers 32. The heater 35 heats the platen 12. When the platen 12 is heated, the recording medium 5 placed on the platen 12 and the ink landed on the recording medium 5 are heated, and drying of the ink is facilitated. The heater 35 is electrically connected to the controller 100. The heating temperature of the heater 35 is controlled by the controller 100.

Figure 3:
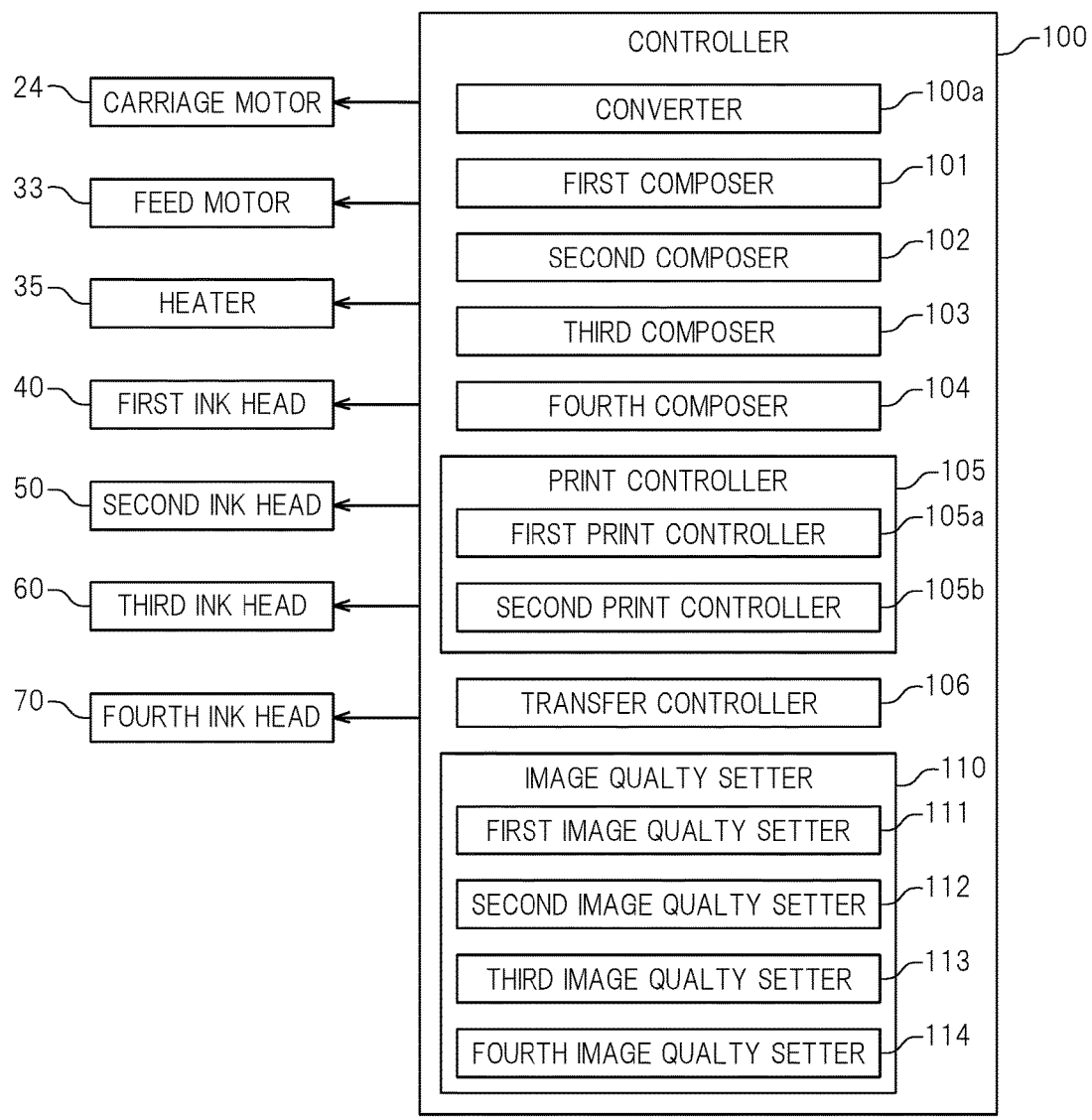
FIG. 3 is a block diagram illustrating the printer.

As illustrated in FIG. 1, an operation panel 120 is provided on a right end portion of the printer main body 10a. The operation panel 120 is provided with a display that displays the operating status, input keys to be operated by the user, and so forth. The controller 100 that controls various operations of the printer 10 is accommodated inside the operation panel 120. FIG. 3 is a block diagram illustrating the printer 10 according to the present preferred embodiment. As illustrated in FIG. 3, the controller 100 is communicatively connected to the feed motor 33, the carriage motor 24, the heater 35, and the first ink head 40, the second ink head 50, the third ink head 60, and the fourth ink head 70 so that the controller 100 is able to control these components. The controller 100 is configured or programmed to include a converter 100a, a first composer 101, a second composer 102, a third composer 103, a fourth composer 104, a print controller 105, a transfer controller 106, and an image quality setter 110.

The configuration of the controller 100 is not limited to a particular configuration. The controller 100 may be a microcomputer, for example. The hardware configuration of the microcomputer is not limited in any way. For example, the microcomputer may include an interface (I/F) that receives print data or the like from external apparatuses such as a host computer, a central processing unit (CPU) that executes control program instructions, a read only memory (ROM) that stores a program or programs executed by the CPU, a random access memory (RAM) used as a working area to deploy the program or programs, and a storage device, such as a memory, that stores the program or programs and various data. The controller 100 need not be provided inside the printer main body 10a. For example, the controller 100 may be a computer that is external to the printer main body 10a and communicatively connected to the printer main body 10a via a wired or wireless communication.

The converter 100a performs what is called a screening process. In the screening process, image data are converted into patterns of ink dots of process color inks. A print image produced by an inkjet printer is formed as an aggregate of ink dots of process color inks. In the inkjet printer 10 according to the present preferred embodiment, an image is converted into ink dot patterns of four colors, cyan, magenta, yellow, and black. The converter 100a may be provided in the printer main body 10a or may be provided in, for example, an external computer.

The first composer 101 receives data for the ink dots of the cyan ink that are produced by the converter 100a and composes a "base dot group" and an "additional dot group", which may include either a portion of the ink dots of the cyan ink or all of the ink dots of the cyan ink. Herein, where all the ink dots of the cyan ink are taken as 100%, the "base dot group" is made up of 100% of the ink dots. In other words, the "base dot group" in the present preferred embodiment matches the ink dots of the cyan ink. The "additional dot group" is a group of ink dots that is extracted from all the ink dots of the cyan ink at a predetermined proportion (="first additional print coverage" that is set by the image quality setter 110, which will be described later).

The "base dot group" and the "additional dot group" are composed for each of the process color inks. Accordingly, in the following description, the "base dot group" of the cyan ink is also referred to as a "first base dot group", and the "additional dot group" of the cyan ink is also referred to as a "first additional dot group". Likewise, in the following description, the "base dot group" of the magenta ink is also referred to as a "second base dot group", the "additional dot group" of the magenta ink as a "second additional dot group", the "base dot group" of the yellow ink as a "third base dot group", the "additional dot group" of the yellow ink as a "third additional dot group", the "base dot group" of the black ink as a "fourth base dot group", and the "additional dot group" of the black ink as a "fourth additional dot group".

The second composer 102 composes the "second base dot group" and the "second additional dot group" from the ink dots of the magenta ink. The proportion of the "second base dot group" with respect to all the ink dots of the magenta ink is 100%, as in the case of the cyan ink. The proportion of the "second additional dot group" with respect to all the ink dots of the magenta ink is a "second additional print coverage" that is set by the image quality setter 110. Likewise, the third composer 103 composes a "third base dot group" and a "third additional dot group" from the ink dots of the yellow ink, and the fourth composer 104 composes a "fourth base dot group" and a "fourth additional dot group" from the ink dots of the black ink. The proportion of the "third base dot group" with respect to all the ink dots of the yellow ink is 100%, and the proportion of the "third additional dot group" with respect to all the ink dots of the yellow ink is a "third additional print coverage" that is set by the image quality setter 110. The proportion of the "fourth base dot group" with respect to all the ink dots of the black ink is 100%, and the proportion of the "fourth additional dot group" with respect to all the ink dots of the black ink is a "fourth additional print coverage" that is set by the image quality setter 110.

Each of the "additional dot groups" is obtained by, for example, applying a predetermined one of the masks to the ink dots of each of the process color inks. Each of the masks may be, for example, a dither mask. The dither mask is a mask that extracts a portion of the ink dots using a dithering method. The dithering method is one of pseudo gradation representation algorithms. With the dithering method, when an ink value for the image data in a microscopic area within the printing area exceeds a predetermined threshold value, the ink dots in that area are set to ON. Conversely, when the ink value of the image data is less than the predetermined threshold value, the ink dots are set to OFF. For example, in the most simple binary dithering, image data are divided into an ON region and an OFF region at one threshold value. Accordingly, an image masked with the dither mask using the binary dithering results in a less dense image with a smaller number of pixels, although the resulting image retains the features of the original image to a certain extent. However, the dithering method is not limited to the binary dithering. For example, possible examples of the dithering method include ordered dithering, which uses a matrix in which threshold values are allocated, and random dithering, in which threshold values are set randomly in a predetermined range. The masking method is not limited to either the binary dithering or the dithering methods, and it is possible to use various types of known pseudo gradation representation algorithms.

As described above, the "base dot group" and the "additional dot group" for each of the process color inks are composed so as to partially overlap each other. More specifically, all the ink dots of the "additional dot group" overlap some of the ink dots of the "base dot group".

The print controller 105 is configured or programmed to control printing operations. The print controller 105 is connected to the carriage motor 24 and the first to the fourth ink heads 40 to 70. The print controller 105 controls them to perform printing. In addition, the print controller 105 controls the temperature of the heater 35 to promote drying of the ink after ejection. The print controller 105 includes a first print controller 105a and a second print controller 105b.

The first print controller 105a forms a "first print layer". The first print layer is a print layer formed of ink dots of "additional dot groups" that are composed by the composers 101 to 104. Herein, the first print layer is printed on the recording medium 5. The first print controller 105a is connected to the carriage motor 24 and a plurality of ink heads 40 to 70. The first print controller 105a controls them to print the first print layer. The details of the controlling by the first print controller 105a will be described later.

The second print controller 105b forms a "second print layer". The second print layer is a print layer formed of ink dots of "base dot groups" composed by the composers 101 to 104. Herein, the second print layer is printed over the first print layer. The printing performed according to the present preferred embodiment is two-layer overprinting, in which the first print layer is a lower layer and the second print layer is an upper layer. The second print controller 105b is connected to the carriage motor 24 and the plurality of ink heads 40 to 70. The second print controller 105b controls the carriage motor 24 and the plurality of ink heads 40 to 70 to print the second print layer. The details of the controlling by the second print controller 105b will be described later.

The transfer controller 106 controls feeding of the recording medium 5. The transfer controller 106 is connected to the feed motor 33. The transfer controller 106 controls the feed motor 33 to transfer the recording medium 5 toward downstream X2 in the sub-scanning direction X. The feeding of the recording medium 5 is performed intermittently between a printing operation and another printing operation. The details of the controlling by the transfer controller 106 will be described later.

The image quality setter 110 sets image quality parameters in printing. The image quality setter 110 sets the proportion of the "additional dot group" with respect to all the ink dots of each of the process color inks. For each of the process color inks, the proportion of the "base dot group" with respect to all the ink dots is fixed to 100%, as described above. As illustrated in FIG. 3, the image quality setter 110 includes a first image quality setter 111, a second image quality setter 112, a third image quality setter 113, and a fourth image quality setter 114.

The first image quality setter 111 sets a "first additional print coverage", which is the proportion of the "first additional dot group" with respect to all the ink dots of the cyan ink. The second image quality setter 112 sets a "second additional print coverage", which is the proportion of the "second additional dot group" with respect to all the ink dots of the magenta ink. The third image quality setter 113 sets a "third additional print coverage", which is the proportion of the "third additional dot group" with respect to all the ink dots of the yellow ink. The fourth image quality setter 114 sets a "fourth additional print coverage", which is the proportion of the "fourth additional dot group" with respect to all the ink dots of the black ink.

FIG. 4 is a view illustrating an example of an image quality setting panel. The image quality setting panel shown in FIG. 4 may be displayed on, for example, on a display screen of a computer by the image quality setter 110. The image quality setting panel may be in a layer that is not operable by the user or may be operable by the user. The image quality setting panel shown in FIG. 4 is capable of setting a first additional print coverage Ra1, a second additional print coverage Ra2, a third additional print coverage Ra3, and a fourth additional print coverage Ra4. The first image quality setter 111 has the function of setting the first additional print coverage Ra1 for the cyan ink. The second image quality setter 112 has the function of setting the second additional print coverage Ra2 for the magenta ink. The third image quality setter 113 has the function of setting the third additional print coverage Ra3 for the yellow ink. The fourth image quality setter 114 has the function of setting the fourth additional print coverage Ra4 for the black ink. Although the proportion of the "base dot group" with respect to the ink dots of each of the process color inks is indicated on the image quality setting panel as the "base print coverage", the proportion is fixed to 100% and cannot be manipulated.

As illustrated in FIG. 4, the additional print coverages relating to the "additional dot groups" of the corresponding process color inks. The first additional print coverage Ra1 is set to about "14%", for example. The second additional print coverage Ra2 is set to about "16%", for example. The third additional print coverage Ra3 is set to about "35%", for example. The fourth additional print coverage Ra4 is set to about "0%", for example. Accordingly, with respect to the ink dots of the "base dot group" (which are in a proportion of 100%), about 14% of ink dots are added for the cyan ink, about 16% for the magenta ink, and about 35% for the yellow ink, but no more ink dot is added for the black ink. The image quality setting panel displays "total print coverages" Rt1 to Rt4, each of which is the total of the "base print coverage" and the "additional print coverage" for each of the process color inks. The total print coverage Rt1 is the total print coverage for the cyan ink, which is about 114% herein, for example. The total print coverage Rt2 is the total print coverage for the magenta ink, which is about 116% herein, for example. The total print coverage Rt3 is the total print coverage for the yellow ink, which is about 135% herein, for example. The total print coverage Rt4 is the total print coverage for the black ink, which is 100% herein. Each of the total print coverages Rt1 to Rt4 is greater than or equal to 100%. Although the image quality setter 110 may serve to adjust other parameters that affect image quality, the description will be omitted in the present preferred embodiment.

As illustrated in FIG. 4, the "additional print coverages" and the "total print coverages" are set to be different values depending on the colors of the process color inks. The purpose is to adjust the color balance of the print image. As discussed previously, because different process color inks have different color developing capability, it is possible that, when printing is carried out with the original image data without adjusting the color balance, the color balance of the resulting print image may become different from the color balance of the original image. That is, the colors of the inks with relatively stronger color developing capability may appear stronger while the colors of the inks with relatively weaker color developing capability may appear weaker in the resulting print image. The term "color developing capability" herein means the degree of how vividly an ink on the recording medium appears. The phrase "color developing capability is weaker" means that the ink does not appear vividly, and the phrase "color developing capability is stronger" means that the ink appears vividly. In the case of the CMYK ink set as in the present preferred embodiment, the yellow ink has the weakest color developing capability, followed by the magenta ink, then the cyan ink, and the black ink has the strongest color developing capability. In conventional inkjet printers, adjustment of the color balance is performed in accordance with the yellow ink, which has the weakest color developing capability. That is, the ejection amounts of the cyan ink, the magenta ink, and the black ink are limited in accordance with that of the yellow ink. However, the image in which the color balance has been adjusted by such a method is printed with smaller amounts of the inks than the image in which the color balance has not been adjusted, and consequently, it has poorer vividness.

In order to solve this problem, the printer 10 according to the present preferred embodiment performs two-layer overprinting of the first print layer and the second print layer. In the second print layer, which is the upper layer, the "base dot groups" of the corresponding process color inks are formed. The "base dot group" of each of the process color inks is composed of 100% of ink dots with respect to all the ink dots of each of the process color inks. The second print layer is a print layer that is printed by fully utilizing the ejection capability of the printer 10. The printer 10 according to the present preferred embodiment allows the second print layer to ensure a sufficient ink ejection and ensures printing vividness.

On the other hand, in the first print layer, which is the lower layer, the "additional dot groups" of the corresponding process color inks are formed. Various "additional print coverages" are set for the "additional dot groups" of the corresponding process color inks. More specifically, a higher "additional print coverage" is set for an ink with a weaker color developing capability, while a lower "additional print coverage" is set for an ink with a stronger color developing capability. In the CMYK color set as disclosed herein, the additional print coverages are set so that the third additional print coverage Ra3 for the yellow ink is set to be the highest, followed by the second additional print coverage Ra2 for the magenta ink, and then the first additional print coverage Ra1 for the cyan ink. Then, the fourth additional print coverage Ra4 for the black ink is set to be the lowest. In the present preferred embodiment, because the "base print coverages" are fixed to 100%, the total print coverages Rt1 to Rt4 are adjusted by adjusting the additional print coverages Ra1 to Ra4. More specifically, the total print coverages Rt1 to Rt4 are adjusted so that an ink with a weaker color developing capability has a higher total print coverage. As a result, the final color balance of the printed product is adjusted.

Thus, the printer 10 according to the present preferred embodiment makes it possible to carry out printing in which both color balance and vividness are improved and satisfactory. In other words, improved and satisfying both color balance and vividness in a printed image is made possible by appropriately adjusting the "total print coverage", which is the sum of the print coverages of the first print layer and the second print layer.

In the present preferred embodiment, the "base print coverage" for each of the process color inks is invariably set to 100%. Such a setting makes it easy to carry out the adjustment such as to satisfy both vividness and color balance in the print image. Specifically, the vividness in the print image is ensured by the "base dot groups", and adjustment of the color balance is dependent only on adjustment of the print coverages of the "additional dot groups".

In the example shown in FIG. 4, the fourth additional print coverage Ra4 for the black ink is set to 0%. As in this case, it is possible that "additional dot groups" may not be set for some process color inks.

Consider a case in which the same color balance as that shown in FIG. 4 is attempted to be achieved with a conventional inkjet printer. In such a case, the print coverage for each of the process color inks is adjusted so that the print coverage for the yellow ink becomes 100%. In the image quality setting panel shown in FIG. 4, the total print coverage Rt3 for the yellow ink is 135% (the third additional print coverage for the third additional dot group: 35%+the third base print coverage: 100%). When this total print coverage Rt3=135% is reduced to 100%, the total print coverage Rt1=114% corresponds to about 84% for the cyan ink. Likewise, the total print coverage Rt2=116% corresponds to about 86% for the magenta ink, and the total print coverage Rt4=100% corresponds to about 74% for the black ink. Thus, when attempting the same color balance as shown in FIG. 4, the conventional technology allows the printer to exhibit only about ¾ of the capability that the printer is designed to exhibit.

The color developing capability of a process color ink is dependent on the content of the coloring material in the ink and the brightness of the color of the ink. The higher the content of the coloring material in the ink, the stronger the color developing capability of the ink. Also, the higher the brightness of the color of the ink, the weaker the color developing capability of the ink. Therefore, it is preferable that the "additional print coverage" should be set higher for an ink having a lower content of the coloring material than for an ink having a higher content of the coloring material, and it is also preferable that a higher "additional print coverage" be set higher for an ink having a higher brightness than that for an ink with a lower brightness.

Based on the "base print coverages" and the "additional print coverages" that are set in the foregoing manner, the printer 10 carries out printing on the recording medium 5. The printer 10 according to the present preferred embodiment is able to perform overprinting of two layers, the first print layer and the second print layer, without transferring the recording medium 5 backward. FIG. 5 is a view illustrating how ink is ejected from the nozzles during printing. In FIG. 5, the nozzles are represented by rectangular frames, and in each of the frames, the "dot group" for the ink ejected from the nozzle is indicated. As for the "dot groups", reference characters AD1, AD2, and AD3 indicate "first additional dot group", "second additional dot group", and "third additional dot group", respectively. Reference characters BD1, BD2, BD3, and BD4 indicate "first base dot group", "second base dot group", "third base dot group", and "fourth base dot group", respectively.

As illustrated in FIG. 5, among the nozzles 41 of the first ink head 40, the nozzles 41 belonging to the first upstream nozzle array 42a eject the cyan ink for the first additional dot group AD1. The other ink heads 50 to 70 are similarly structured. Among the nozzles 51 of the second ink head 50, the nozzles 51 belonging to the second upstream nozzle array 52a eject the magenta ink for the second additional dot group AD2. Among the nozzles 61 of the third ink head 60, the nozzles 61 belonging to the third upstream nozzle array 62a eject the yellow ink for the third additional dot group AD3. In other words, the process color inks for the "additional dot groups" are ejected from the nozzles of the upstream nozzle arrays. The ejection amount of the cyan ink for the first additional dot group AD1 is about 14% with respect to the ejection amount designated by the print data, for example. The ejection amount of the magenta ink for the second additional dot group AD2 is about 16% with respect to the ejection amount designated by the print data, for example. The ejection amount of the yellow ink for the third additional dot group AD3 is about 35% with respect to the ejection amount designated by the print data, for example. Note that among the nozzles 71 of the fourth ink head 70, the nozzles 71 belonging to the fourth upstream nozzle array 72a do not eject the black ink. The reason is that the ejection amount of the black ink for the fourth additional dot group is set to about 0%, for example. The first print layer is printed by the ejection of the inks for these "additional dot groups".

As illustrated in FIG. 5, among the nozzles 41 of the first ink head 40, the nozzles 41 belonging to the first downstream nozzle array 42b eject the cyan ink for the first base dot group BD1. The other ink heads 50 to 70 are also similarly structured. Among the nozzles 51 of the second ink head 50, the nozzles 51 belonging to the second downstream nozzle array 52b eject the magenta ink for the second base dot group BD2. Among the nozzles 61 of the third ink head 60, the nozzles 61 belonging to the third downstream nozzle array 62b eject the yellow ink for the third base dot group BD3. Among the nozzles 71 of the fourth ink head 70, the nozzles 71 belonging to the fourth downstream nozzle array 72b eject the black ink for the fourth base dot group BD4. In other words, the process color inks for the "base dot groups" are ejected from the nozzles of the downstream nozzle arrays. The ejection amount of each ink for the base dot groups BD1 to BD4 is 100% with respect to the ejection amount of each ink that is designated by the print data. The second print layer is printed by the ejection of the inks for these "base dot groups".

When printing the first print layer, the first print controller 105a drives the carriage motor 24 so as to cause the carriage 25 to move along the main scanning direction Y and also drives the actuators to eject inks from predetermined nozzles, to cause inks of predetermined process color inks to land on a print surface of the recording medium 5. The first print controller 105a causes the carriage 25 to move along the main scanning direction Y one time or a plurality of times to form the first print layer at a position on the recording medium 5 with respect to the sub-scanning direction X. The number of times of the scanning that is necessary to complete the first print layer is not limited. The first print layer may be printed by either a so-called single pass technique or a so-called multi-pass technique. The second print controller 105b controls the carriage motor 24 and the actuators in a like manner when printing the second print layer.

After the first print layer and the second print layer are printed on a position of the recording medium 5, the transfer controller 106 controls the feed motor 33 to transfer the recording medium 5 toward downstream X2 in the sub-scanning direction X. By this transferring, the surface area of the recording medium 5 located below the upstream nozzle arrays (i.e., the area in which the first print layer has been printed) is moved below the downstream nozzle arrays. The surface area of the recording medium 5 located below the downstream nozzle arrays (i.e., the area in which the second print layer has been printed) is moved to a position above the heater 35 on the platen 12. The ink that has landed on that position is heated and dried by the heater 35.

As illustrated in FIG. 5, in each of the ink heads, the upstream nozzle array is located upstream X1 of the downstream nozzle array with respect to the sub-scanning direction X. The recording medium 5 is transferred from the rear Rr to the front F (from upstream X1 to downstream X2 along the sub-scanning direction X) by the sub-scanning-direction conveyor 30. For that reason, the upstream nozzle arrays always precede the downstream nozzle arrays in terms of printing position. Accordingly, when viewed at the same printing position, the inks ejected from the upstream nozzle arrays form a print layer below the inks ejected from the downstream nozzle arrays. The printer 10 according to the present preferred embodiment repeats printing and transferring of the recording medium 5 intermittently during a printing process. This repeating operation enables the printer 10 according to the present preferred embodiment to perform the two-layer overprinting without transferring the recording medium 5 backward, toward upstream X1 along the sub-scanning direction X.

In the present preferred embodiment, the first print layer of the "additional dot groups" is formed to be the lower layer while the second print layer of the "base dot groups" is formed to be the upper layer. However, it is possible that the first print layer be formed over the second print layer. In that case, the upstream/downstream relationship of the nozzle arrays is inverted when printing. That is, the process color inks for the base dot groups BD1 to BD4 are ejected from the nozzles of the upstream nozzle arrays. The process color inks for the additional dot groups AD1 to AD3 are ejected from the nozzles of the downstream nozzle arrays. Thus, it is also possible that the printer 10 according to the present preferred embodiment is able to print the second print layer to be the lower layer and the first print layer to be the upper layer. In this case as well, it is possible to perform the printing without transferring the recording medium 5 backward.

Second Preferred Embodiment

A second preferred embodiment of the present invention makes it possible to shift the color balance of the print image. The technology disclosed herein may also be utilized to shift the color balance intentionally in a specific direction, as well as to achieve the color balance that the print image should desirably have. A printer according to the present preferred embodiment is the same as the printer 10 according to the first preferred embodiment, except for this point. For this reason, in the description of the present preferred embodiment, the same elements and features as in the first preferred embodiment are designated by the same reference numerals and will not be further elaborated upon.

FIG. 6 is a view illustrating an example of an image quality setting panel according to the present preferred embodiment. FIG. 6 shows three image qualities, A, B, and C. The user is allowed to select one of the image qualities A to C with selection buttons SB. The selection buttons SB are a representation of "image quality selector" displayed on a screen, that is able to select one of a plurality of image qualities. Image quality parameters are set for each of the image qualities A, B, and C. In FIG. 6, "additional print coverage" is able to be manipulated by the user. The "base print coverage" and the "total print coverage" cannot be manipulated by the user, as in the case of FIG. 4.

The same "additional print coverages" as those shown in FIG. 4 are set for the image quality A among the three image qualities. That is, the image quality A is the print image quality described in the first preferred embodiment. The printer 10 according to the present preferred embodiment is able to select the same image quality as that in the first preferred embodiment. The image quality A is an image quality in which the differences in color developing capability between the process color inks are adjusted so that the color balance closer to that of the image data is able to be obtained. The image quality A is what is called a normal image quality.

The image quality B is an image quality in which cold colors are enhanced. In the image quality B, the first additional print coverage Ra1 for the cyan ink is set higher than the second additional print coverage Ra2 for the magenta ink. The image quality B increases the first additional print coverage Ra1 for the cyan ink and reduces the second additional print coverage Ra2 for the magenta ink, in comparison with the normal image quality A. Thus, the image that is printed based on the image quality B is expected to have a color tone that appears paler than that in the original image.

The image quality C is an image quality in which warm colors are enhanced. In the image quality C, the second additional print coverage Ra2 for the magenta ink is set higher than the first additional print coverage Ra1 for the cyan ink. The image quality C reduces the first additional print coverage Ra1 for the cyan ink and increases the second additional print coverage Ra2 for the magenta ink, in comparison with the normal image quality A. Thus, the image that is printed based on the image quality C is expected to have a color tone that appears warmer than that in the original image.

The printer 10 according to the present preferred embodiment is able to adjust the color tone of the print image in response to selection by the user. In particular, the cyan ink and the magenta ink have an intermediate color developing capability between that of the yellow ink, which has the weakest color developing capability, and that of the black ink, which has the strongest color developing capability, so they are suitable for fine tuning of the color balance.

The foregoing preferred embodiment describes that a plurality of types of image qualities are prepared for the printer 10 and the user is allowed to select a desired image quality from the prepared image qualities, but this is merely an example. The image quality setting panel may be structured so that, for example, the user is allowed to finely tune the color balance in a prepared standard image quality (for example, the image quality A in FIG. 6). This fine tuning may preferably be carried out by, for example, a control knob indicator that is movable between warm color side and cold color side.

In the present preferred embodiment, the color tone is adjusted by adjusting the additional print coverages of the cyan ink and the magenta ink, but the inks for which the additional print coverages should be adjusted are not limited to the cyan ink and the magenta ink. The inks for which the additional print coverages should be adjusted may include one or both of the yellow ink and the black ink, or may not include either or both of the cyan ink and the magenta ink. Or, when a larger number of colors of process color inks than four colors are used, it is possible to include an ink other than the four colors CMYK.

Hereinabove, preferred embodiments of the present invention have been described. It should be noted, however, that the foregoing preferred embodiments are merely exemplary and the present invention may be embodied in various other forms.

For example, in the foregoing preferred embodiments, the "base dot group" is equivalent to 100% of the ink dots of each of the process color inks. In other words, the image formed in the second print layer is exactly the original image on the print data. However, it is not always necessary that the image formed in the second print layer be identical to the original image. For example, when a total print coverage of about 135% needs to be set for the yellow ink, it is also possible to allocate about 90% for the "base dot group" and about 45% for the "additional dot group", for example. Such allocation is effective when, for example, the ink ejection amount for the first print layer should be reduced from the viewpoint of drying of the ink.

In the foregoing preferred embodiments, the print layers include two layers, the first print layer and the second print layer, but the print layers may include three or more layers. For example, due to the requirement in drying of the inks, it is possible to eject the inks separately for three or more print layers. It is also possible that the number of stacked layers may be varied depending on the types of process color inks.

In the present preferred embodiment, the nozzle array in each of the ink heads 40 to 70 is divided into the upstream nozzle array and the downstream nozzle array, and each of the upstream nozzle array and the downstream nozzle array ejects either one of the ink for the "base dot group" or the ink for the "additional dot group". However, the nozzle array in each of the ink heads may not necessarily be divided into upstream and downstream arrays, and it is unnecessary that different nozzle arrays have different roles. It is also possible that the printing of the first print layer and the printing of the second print layer may be carried out separately in two completely separate steps.

In the foregoing preferred embodiments, a plurality of colors of inks are ejected from different ink heads, but this is not always the case. It is possible that a single ink head may include a plurality of nozzle arrays so that the single ink head can eject a plurality of colors of inks. The "recording head" in this disclosure also includes such an ink head.

In the foregoing preferred embodiments, the inkjet system used to eject ink preferably is a piezo-electric system, in which the volume of a pressure chamber is changed by displacement of a piezoelectric element. However, the inkjet system of the printer according to the present invention may be selected from various types of inkjet systems, including various continuous inkjet systems such as binary deflection inkjet system and a continuous deflection inkjet system, and various on-demand inkjet systems such as a thermal inkjet system. The inkjet systems of preferred embodiments of the present invention is not limited to any particular inkjet system.

In the foregoing preferred embodiments, the carriage 25 moves along the main scanning direction Y and the recording medium 5 moves along the sub-scanning direction X, but this is not necessarily required to practice preferred embodiments of the present invention. The movements of the carriage 25 and the recording medium 5 are relative, so either one of them may move along the main scanning direction Y or along the sub-scanning direction X. For example, it is possible that the recording medium 5 may be placed immovably while the carriage 25 may be allowed to move both along the main scanning direction Y and the sub-scanning direction X. Alternatively, it is possible that both the carriage 25 and the recording medium 5 may be allowed to move both along the main scanning direction Y and the sub-scanning direction X.

Furthermore, the technology disclosed herein may be applied to various types of inkjet printers. In addition to the so-called roll-to-roll inkjet printers as shown in the foregoing preferred embodiments, in which a rolled recording medium 5 is delivered, the technology may also be applied to flat-bed inkjet printers, for example, in a similar manner. Moreover, the printer 10 is not limited to a printer that is to be used alone as an independent printer, but may be a printer that is combined with another apparatus. For example, the printer 10 may be incorporated in another apparatus.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer comprising:
   a recording head including:
      a first ink head including a plurality of first nozzles that eject a first ink onto a recording medium, to form ink dots of the first ink on the recording medium; and
      a second ink head including a plurality of second nozzles that eject a second ink onto the recording medium to form ink dots of the second ink on the recording medium, the second ink having a weaker color developing capability for the recording medium than the first ink; and
   a controller configured or programmed to include:
      a first composer that receives data for the ink dots of the first ink, and composes one or a plurality of first dot groups including at least a first base dot group from the ink dots of the first ink;
      a second composer that receives data for the ink dots of the second ink, and composes a plurality of second dot groups including a second base dot group and a second additional dot group from the ink dots of the second ink;
      a first print controller that controls the recording head to cause ink dots including at least the second additional dot group to form a first print layer on the recording medium;
      a second print controller that controls the recording head to cause ink dots including at least the first base dot group and the second base dot group to form a second print layer over or under the first print layer;
      a first dot proportion setter that sets a proportion or proportions of the one or more first dot groups so that a total of the proportion or the proportions of the one or more first dot groups with respect to the ink dots of the first ink becomes a first print coverage of greater than or equal to 100%; and a second dot proportion that sets setting proportions of the plurality of second dot groups so that a total of the proportions of the plurality of second dot groups with respect to the ink dots of the second ink becomes a second print coverage that is greater than the first print coverage.

2. The inkjet printer according to claim 1, wherein the second ink has a lower coloring material content than the first ink.

3. The inkjet printer according to claim 1, wherein the second ink has a higher brightness than the first ink.

4. The inkjet printer according to claim 1, wherein
the first dot proportion setter sets a proportion of the first base dot group to 100% with respect to the ink dots of the first ink; and
the second dot proportion setter sets a proportion of the second base dot group to 100% with respect to the ink dots of the second ink.

5. The inkjet printer according to claim 1, further comprising:
a sub-scanning-direction conveyor that transfers the recording medium along a sub-scanning direction relative to the recording head; wherein
the controller is configured or programmed to include a transfer controller that controls the sub-scanning-direction conveyor;
the first ink head and the second ink head are arranged side by side along a main scanning direction perpendicular or substantially perpendicular to the sub-scanning direction;
the first ink head includes a first upstream nozzle array and a first downstream nozzle array, the first upstream nozzle array including a portion of the plurality of first nozzles arrayed along the sub-scanning direction, and the first downstream nozzle array located downstream relative to the first upstream nozzle array with respect to the sub-scanning direction and including another portion of the plurality of first nozzles arrayed along the sub-scanning direction;
the second ink head includes a second upstream nozzle array and a second downstream nozzle array, the second upstream nozzle array including a portion of the plurality of second nozzles arrayed along the sub-scanning direction, and the second downstream nozzle array located downstream relative to the second upstream nozzle array with respect to the sub-scanning direction and including another portion of the plurality of second nozzles arrayed along the sub-scanning direction;
the first print controller causes the second nozzles of the second upstream nozzle array to eject the second ink to form ink dots of the second additional dot group, to form the first print layer;
the transfer controller controls the sub-scanning-direction conveyor to transfer the recording medium toward downstream along the sub-scanning direction relative to the recording head; and
the second print controller causes the first nozzles of the first downstream nozzle array to eject the first ink to form ink dots of the first base dot group, and causes the second nozzles of the second downstream nozzle array to eject the second ink to form ink dots of the second base dot group, to form the second print layer over the first print layer.

6. The inkjet printer according to claim 1, further comprising:
a sub-scanning-direction conveyor that transfers the recording medium along a sub-scanning direction relative to the recording head; wherein
the controller is configured or programmed to include a transfer controller that controls the sub-scanning-direction conveyor;
the first ink head and the second ink head are arranged side by side along a main scanning direction orthogonal to the sub-scanning direction;
the first ink head includes a first upstream nozzle array and a first downstream nozzle array, the first upstream nozzle array including a portion of the plurality of first nozzles arrayed along the sub-scanning direction, and the first downstream nozzle array located downstream relative to the first upstream nozzle array with respect to the sub-scanning direction and including another portion of the plurality of first nozzles arrayed along the sub-scanning direction;
the second ink head includes a second upstream nozzle array and a second downstream nozzle array, the second upstream nozzle array including a portion of the plurality of second nozzles arrayed along the sub-scanning direction, and the second downstream nozzle array located downstream relative to the second upstream nozzle array with respect to the sub-scanning direction and including another portion of the plurality of second nozzles arrayed along the sub-scanning direction;
the second print controller causes the first nozzles of the first upstream nozzle array to eject the first ink to form ink dots of the first base dot group, and causes the second nozzles of the second upstream nozzle array to eject the second ink to form ink dots of the second base dot group, to form the second print layer;
the transfer controller controls the sub-scanning-direction conveyor to transfer the recording medium toward downstream along the sub-scanning direction relative to the recording head; and
the first print controller causes the second nozzles of the second downstream nozzle array to eject the second ink to form ink dots of the second additional dot group, to form the first print layer over the second print layer.

7. The inkjet printer according to claim 1, wherein the recording head includes:
a third ink head including a plurality of third nozzles that eject a third ink onto the recording medium, to form ink dots of the third ink on the recording medium; and
a fourth ink head including a plurality of fourth nozzles that eject a fourth ink onto the recording medium, to form ink dots of the fourth ink on the recording medium; wherein
each of the third ink and the fourth ink has a stronger color developing capability for the recording medium than the second ink and has a weaker color developing capability for the recording medium than the first ink; and
the controller is configured or programmed to include:
an image quality selector to select one of a plurality of print image qualities including a first image quality and a second image quality;
a third composer that receives data for the ink dots of the third ink, and composes a plurality of third dot groups including a third base dot group and a third additional dot group from the ink dots of the third ink;

a fourth composer that receives data for the ink dots of the fourth ink, and composes a plurality of fourth dot groups including a fourth base dot group and a fourth additional dot group from the ink dots of the fourth ink;

a third dot proportion that sets setting proportions of the plurality of third dot groups so that a total of the proportions of the plurality of third dot groups with respect to the ink dots of the third ink becomes a third print coverage of greater than 100%; and a fourth dot proportion setter that sets proportions of the plurality of fourth dot groups so that a total of the proportions of the plurality of fourth dot groups with respect to the ink dots of the fourth ink becomes a fourth print coverage of greater than 100%; wherein the first print controller controls the recording head to form the third additional dot group and the fourth additional dot group in the first print layer;

the second print controller controls the recording head to form the third base dot group and the fourth base dot group in the second print layer; and the third dot proportion setter and the fourth dot proportion setter set the third print coverage to be greater than the fourth print coverage when the first image quality is selected, and set the third print coverage to be less than the fourth print coverage when the second image quality is selected.

8. The inkjet printer according to claim 7, wherein
the first ink is black ink;
the second ink is yellow ink;
the third ink is cyan ink; and
the fourth ink is magenta ink.

* * * * *